Sept. 13, 1949.    L. C. JOHNSON    2,481,519
ANIMAL TRAP

Filed Sept. 6, 1946    3 Sheets-Sheet 1

INVENTOR.
LEONARD C. JOHNSON

ATTORNEYS

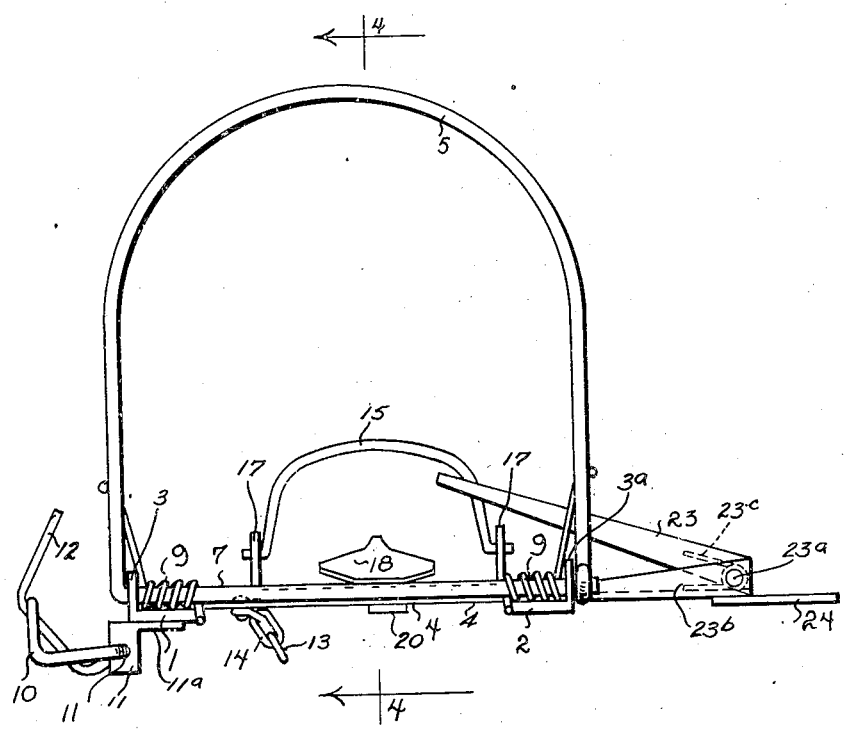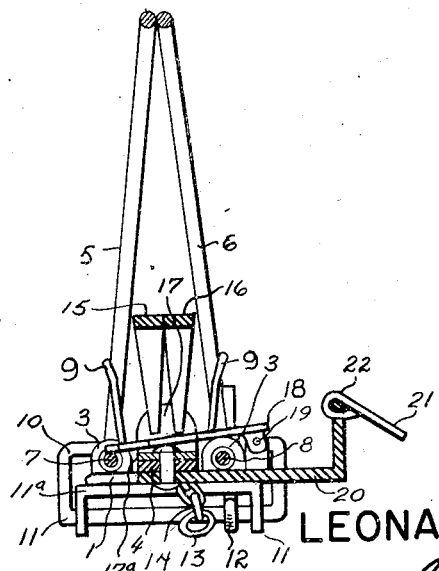

Sept. 13, 1949.　　　　L. C. JOHNSON　　　　2,481,519
ANIMAL TRAP
Filed Sept. 6, 1946　　　　　　　　　　3 Sheets-Sheet 3
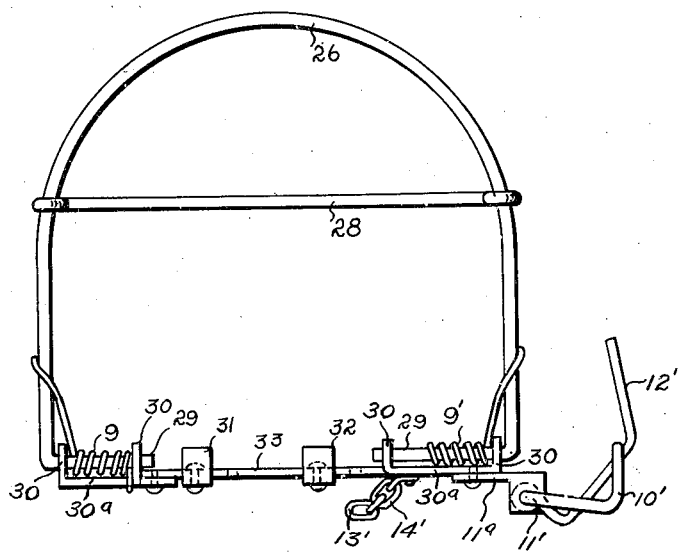
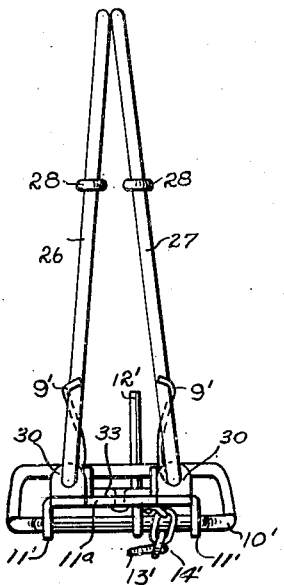
INVENTOR.
LEONARD C. JOHNSON
ATTORNEYS Patented Sept. 13, 1949

2,481,519

UNITED STATES PATENT OFFICE 2,481,519

ANIMAL TRAP

Leonard C. Johnson, Rio, Wis.

Application September 6, 1946, Serial No. 695,258

4 Claims. (Cl. 43—88)

My present invention relates generally to improvements in animal traps of the type including dual, spring-closed pairs of hinged or pivoted jaws, one of which dual traps is baited and trigger-actuated to release the dual traps for dual snapping operations in trapping the victim.

A releasable safety device is employed for setting and initially retaining a large trap in set condition while a smaller trap is being set and baited, after which the safety device is released.

The safety device is utilized in connection with a latch and latch-keeper of the larger trap, and one of the jaws of the smaller trap when set coacts with the latch-keeper of the larger trap for retaining the larger trap in set condition.

The primary object of the invention is the provision of jointly operated dual traps which are designed respectively to catch a leg of the victim as well as the body of the animal, in order to prevent its escape; and the appliance is composed of a minimum number of parts that may be manufactured with facility at low cost of production. The component parts of the appliance are light in weight to assure convenience in assembling, and the parts when assembled provide a compactly arranged structure that is simple in operation, and which may be manipulated with facility for setting operations.

The invention consists in certain novel combinations and arrangements of these parts as will hereinafter be described and more specifically set forth in my appended claims.

In the accompanying drawings I have illustrated one complete example of the physical embodiment of my invention wherein the parts are combined and arranged in accord with one mode I have devised for the practical application of the principles of my invention. I have also illustrated in the drawings a modified form of the invention, and it will be understood that other changes and alterations may be made and are contemplated in the exemplifying drawings and mechanical structures, within the scope of my claims, without departing from the principles of the invention.

Figure 3 is a side elevation of the dual trap in sprung or closed position.

Figure 4 is a transverse sectional view of the appliance in Fig. 3.

Figure 5 is a view in side elevation of a modified attachment embodying the invention, and shown in snapped or closed position.

Figure 6 is a view in end elevation looking from the left hand side of Fig. 5.

In carrying out my invention I employ as a supporting frame for the appliance two spaced end plates 1 and 2 having perpendicularly disposed apertured integral flanges 3 and 3a, and these end plates are united by a longitudinally extending plate 4, the whole forming a substantial base for the appliance.

Figure 1:
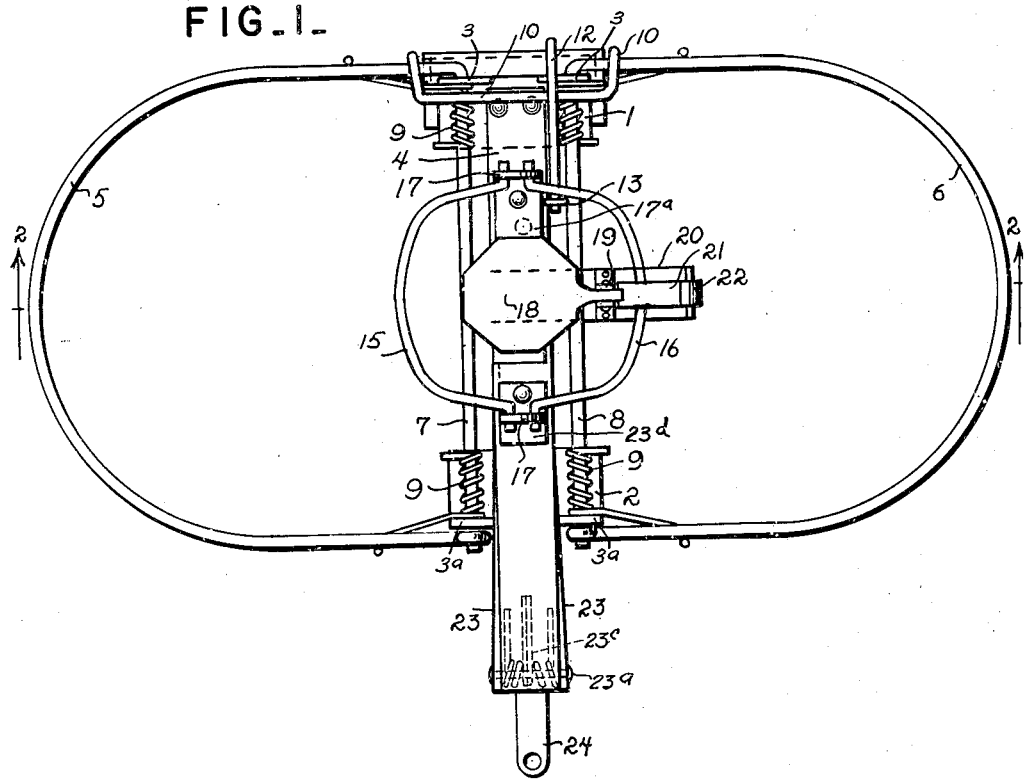
Figure 1 is a plan view of a dual trap in which my invention is embodied, showing the traps in open and set position.
Figure 2:
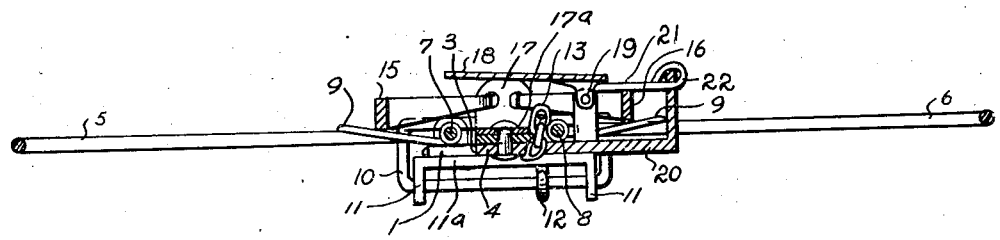
Figure 2 is a transverse detail sectional view as at line 2—2 of Fig. 1.

The larger or outer of the dual traps includes two opposed U-shaped jaws 5 and 6 having straight rock bars 7 and 8 arranged in parallelism at the opposite sides of the base, journaled in the apertured flanges 3 and 3a, and each rock bar is equipped with a helical spring, as 9, for swinging the jaws from open position in Fig. 1 to closed position of Fig. 3.

The jaws are held in open set position by means of a transversely arranged yoke 10 that is hinged in the depending apertured ears 11 of the plate 11a fixed to the bottom of the end plate 1 of the base to form a latch projecting over and retaining the jaws in open position, and the latch is retained by a longitudinally extending latch-keeper 12 that is pivotally mounted on the transverse yoke or latch 10.

In setting the outer or larger trap, the latch-keeper is initially and temporarily retained in position over the latch by a safety device consisting of a detachable fastening ring 13 slipped over the latch-keeper, and forming part of a short chain 14 that is attached at the underside of the base plate 4. After the inner or smaller of the dual traps is set, the ring is slipped off the latch-keeper, and the latter is retained in operative position by co-action therewith of the set smaller or inner trap, which includes a pair of opposed spring-closed jaws 15 and 16.

The jaws 15 and 16 of the inner trap are pivoted in the perpendicularly disposed apertured flanges 17 which are integral with the plate 17a fixed to the plate 4 by suitable fastening means and the flanges 17 are positioned at opposite sides of the longitudinal center of the base, and a centrally arranged base plate 18 is pivoted at 19 in bracket ears rigid with a laterally extending base arm 20. A releasable trigger 21 is pivoted or hinged at 22 on an upright flange of the plate 20, with the free end of the trigger engaged under an overlapping edge of the bait-plate for retaining the inner trap in set position.

When the pivoted bait-plate is tilted to release the trigger from pressure on the jaw 16, the two jaws 15 and 16 are snapped together by means of a lever 23 that is pivotally mounted on the pin 23a journalled in the perpendicularly disposed inclined flanges 23b integral with the outer end of the plate 4. Two coil springs 23c mounted on this pin 23a tension the lever 23 to urge it upwardly as in Figure 3. The jaws 15 and 16 being positioned in the opening 23d in the inner end of the lever. An anchoring arm 24 fixed to the outer end of the plate 4 forms an extension of the base. By means of the anchoring arm the appliance is retained on or affixed to a suitable support to prevent displacement of the device.

In set position of the inner or smaller trap the two leaf springs are pressed down by and under the two jaws 15 and 16, and when these set jaws are released the springs swing the jaws together from the set position in Fig. 1 to the closed position of Fig. 3.

The trigger is released by the weight or load of the victim on the tiltable bait-plate, and then the pairs of released spring-pressed jaws are swung on their pivots or hinges to snap at opposite sides against a leg or legs and the body of the victim.

In the form of the trap previously described the elements carrying the jaws 15 and 16 are fixed to the plate 4. In the modified form of the invention in Figs. 5 and 6, it is embodied in a device that may be used as an attachment to this type of animal trap, in that the elements carrying jaws 15 and 16 may be removably attached to the base plate 4. In this instance the two jaws 26, 27 that are provided with cross braces 28, 28, are provided with rock-shafts 29 journaled in the perpendicularly disposed apertured flanges 30 of the bearing plate 30a. The springs 9', 9', serve to close the jaws when the latch 10' and the latch-keeper 12' are released, and this modified part of the dual trap may be clamped at 31, 32, with the clamp plate 33, to the plate 4 of the base of the trap in Fig. 1.

Having thus fully described my invention, what I claim as new and desire to secure by Letters Patent is:

1. In a dual animal trap, the combination with an outer pair of opposed spring-pressed jaws, a pivoted latch retaining the jaws in set position, a pivoted latch-keeper, and a releasable safety device initially co-acting with the latch-keeper, of an inner pair of spring-closed jaws, one of said jaws adapted to retain the latch-keeper in operative position after release of the safety device, and a trigger-actuated movable bait-device co-acting with the last mentioned inner jaw to hold the dual traps in set position.

2. In a dual animal trap, the combination with a pair of spring pressed jaws, a pivoted latch retaining the jaws in set position, a pivoted keeper for the latch, and a releasable safety device initially retaining the latch-keeper in set position, of a second trap having a pair of spring pressed jaws, one of said jaws co-acting with the latch-keeper to retain the first pair of spring pressed jaws in set position after release of the safety device, and means for automatically releasing the second pair of spring-pressed jaws.

3. In a dual animal trap, the combination with a pair of spring-pressed jaws, a pivoted yoke forming a latch engaging said jaws in set position, a bar pivoted on the yoke and forming a keeper for the latch, and a chain having a link enclosing said bar and anchored to the trap, of a second trap having a pair of spring-pressed jaws, one of said jaws co-acting with the latch-keeper to retain the first pair of jaws in set position after release of the chain, and trigger-actuated means co-acting with the last mentioned jaw of the second trap for releasing the jaws of the second trap.

4. In a dual animal trap, the combination with a pair of spring pressed jaws, a pivoted latch retaining said jaws in set position, a latch-keeper, and a chain having a link detachably mounted on the latch-keeper, of a second trap having a pair of spring-pressed jaws, one of said jaws adapted for retaining the latch-keeper in set position after release of the chain, a pivoted bait-plate mounted within the second pair of jaws, and a trigger device retaining the bait-plate in set position.

LEONARD C. JOHNSON.

REFERENCES CITED

The following references are of record in the file of this patent:

UNITED STATES PATENTS

| Number | Name | Date |
| --- | --- | --- |
| 1,279,782 | Stephens | Sept. 24, 1918 |
| 2,292,695 | Johnson | Aug. 11, 1942 |